Patented May 17, 1949

2,470,395

UNITED STATES PATENT OFFICE 2,470,395

APPARATUS FOR CARRYING OUT CATALYTIC REACTIONS

Edwin J. Gohr and Charles W. Tyson, Summit, N. J., assignors to Standard Oil Development Company, a corporation of Delaware Application October 22, 1942, Serial No. 462,914

1 Claim. (Cl. 23—288)

The present invention relates to the art of carrying out reactions in the presence of finely divided or powdered solids and more specifically to an apparatus for carrying out reactions with fluidized solids, whether the solid be the reactant, a catalyst or diluent added for heating or cooling or for other reasons. The invention will be fully understood from the following description and the drawings.

Figure 1:
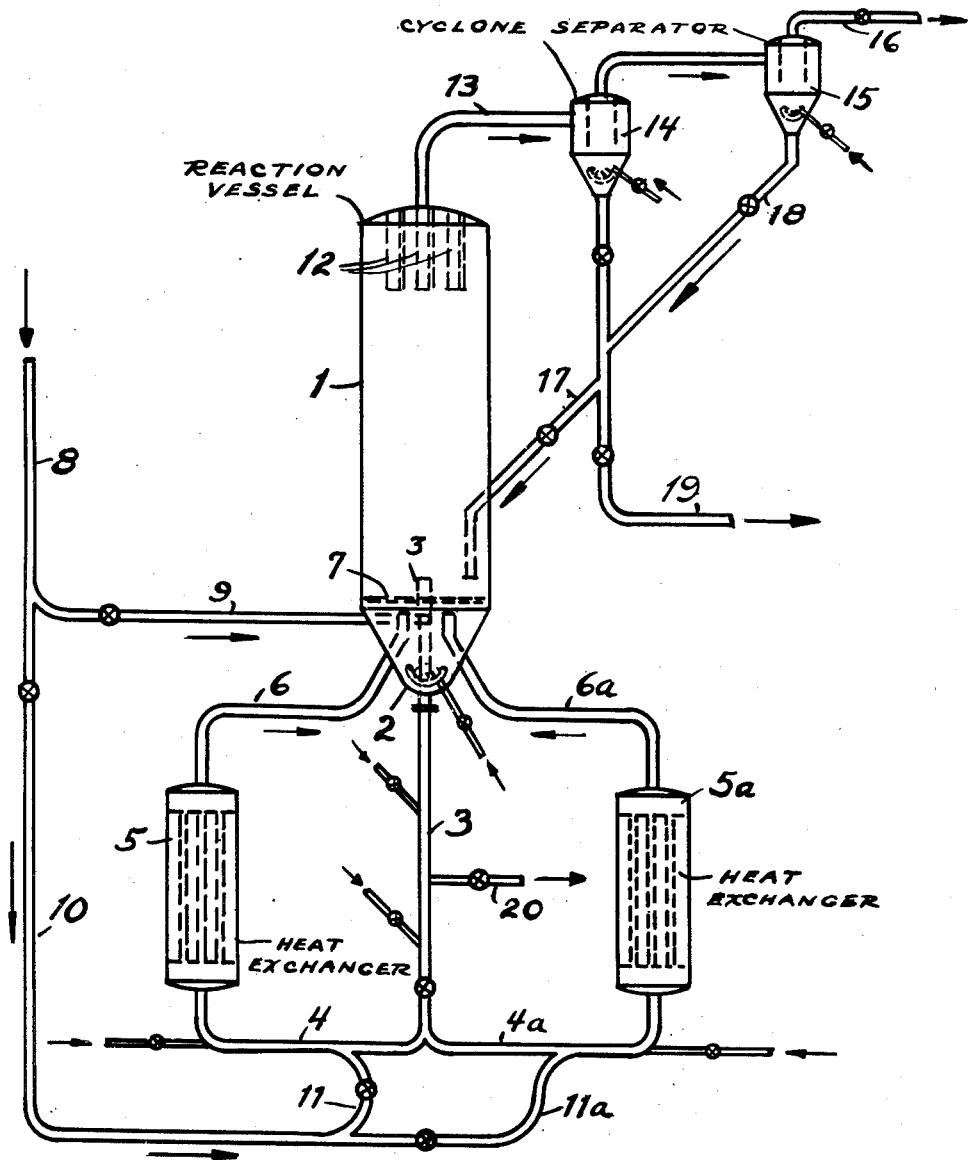

In the drawings, Fig. 1 is a semi-diagrammatic view in sectional elevation of a reaction vessel employed for reactions involving fluidized solids and showing the recirculation lines by which a stream of fluidized solid is withdrawn and returned to the reaction vessel.

Figure 2:
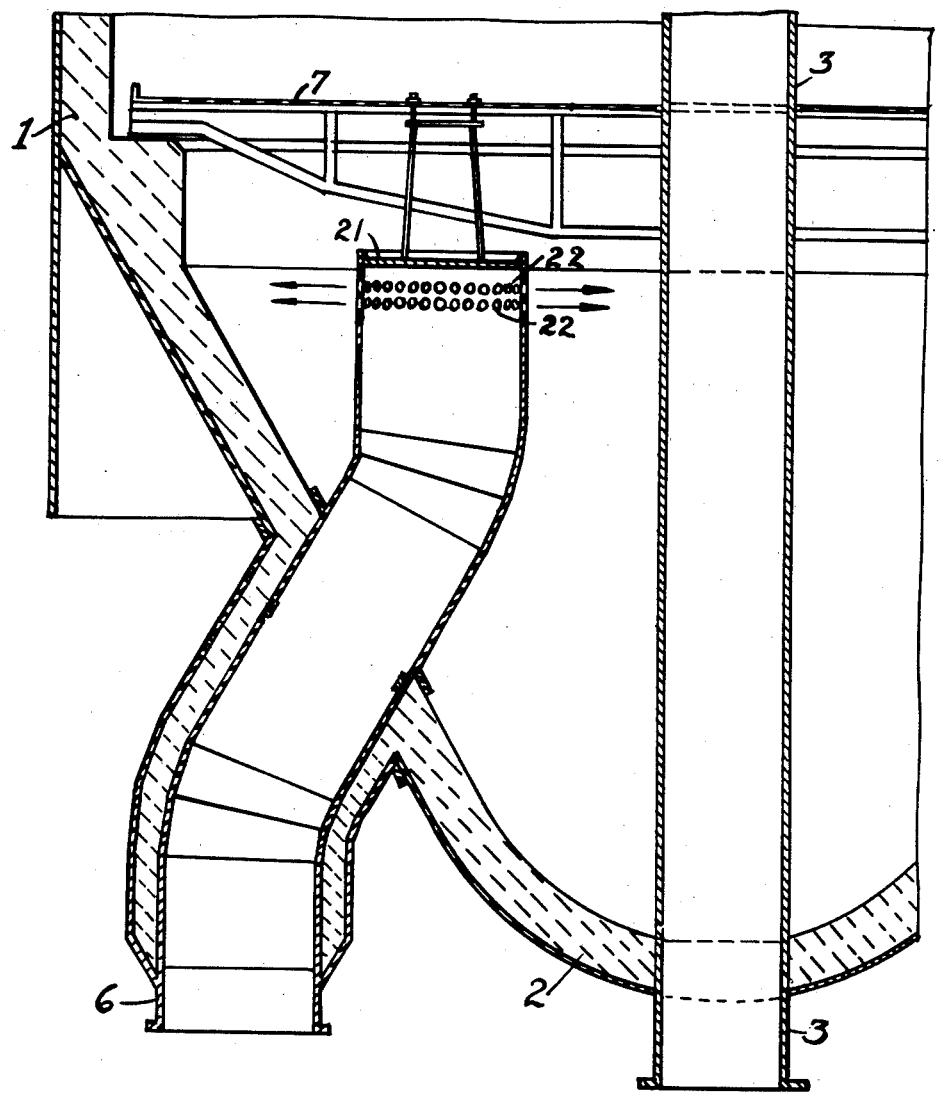

Fig. 2 is an enlarged view of that portion of the vessel in which the recirculated catalyst or other solid is redischarged into the reaction vessel.

Many reactions in which solid materials are involved may be advantageously carried out employing the solid in a fluidized condition. The great advantage of this is that the process may be made continuous and the solid may be readily passed into and through the equipment. By fluidized condition is meant that the solid material, in powdered form, is dispersed in a gaseous or vaporous medium so as to produce a very dense suspension which exhibits many of the characteristics of a liquid, that is to say it exerts static and dynamic heads and flows like a liquid. These reactions, for example, may be the cracking or dehydrogenation of hydrocarbons in the presence of a fluidized catalyst, the reduction of iron oxide or metal oxides by means of hydrogen so as to produce iron or other metals and in which the oxides or other metals are in fluidized condition, the production of hydrogen by reaction of steam with iron or a lower oxide thereof in a fluidized condition. Another use is in the regeneration by air oxidation at elevated temperature of catalysts which have been fouled by a deposition thereon of carbon or sulfur. The above processes are given merely as examples and it will be understood that the system may be of broad general use in chemical, metallurgical and petroleum industries.

The fluidized solid employed in all of the reactions described above flows like liquid and the heating and cooling of the reaction vessel is readily accomplished by withdrawing a stream of the fluidized solid from the reaction vessel, passing the same through a heat exchanger to add or subtract heat, and returning the stream to the reactor. When a single exchanger is employed, the system gives little difficulty but in larger installations it is generally much more convenient to employ several exchangers, operating on separate streams, and a peculiar and undesirable condition may be set up. Especially on bringing such a system into operation and when the density of the fluidized streams is low, circulation may occur among the several recirculation lines and exchangers, the fluidized solid flowing properly through some of these lines and in the reverse direction in the remainder. To prevent such a condition is one of the objects of the present invention. Other objects will be apparent to those skilled in the art.

Referring to the drawing, in Fig. 1, numeral 1 denotes an upright or vertical reaction vessel in which solid material whether a catalyst, a reactant or inert diluent is present in a fluidized condition. The reactor is furnished with a conical bottom 2 and a withdrawal pipe 3 which is split into a plurality of branches of which, in this instance, two, 4 and 4a are shown. Each of these pipes feeds a heat exchanger 5 and 5a respectively. Fluidized streams from these exchangers are redischarged into the reaction vessel 1 by pipes 6 and 6a respectively, just below a grid or screen 7 which may be omitted but is preferably located in the lower part of the reaction vessel. If a distributor plate is utilized, the pipes 6 and 6a should discharge into the vessel not more than two feet below the plate. The withdrawal pipe 3 referred to above is preferably extended up into the reactor above the distributor plate 7, as shown.

The reactor is fed by pipe 8 which may discharge a previously prepared stream of fluidized solid directly into the reactor, preferably below the grid 7, by means of a pipe 9, or in the alternative the stream from pipe 8 may be directed by pipe 10 to the branched pipes 11 and 11a and thus into the flow lines 4 and 4a, mentioned above.

In the upper portion of reactor 1, dust separators 12 may be placed so as to return a portion of the solid material to the reactor, and vapor, still containing some of the solid, flows out of the top of the reactor by a pipe 13 to a set of cyclone separators 14 and 15. The vapor now practically free of solid is finally removed from the system by pipe 16 and may be disposed of according to the particular process used. The solid collected in the cyclones may be returned to the reactor by pipes 17 and 18 or may be withdrawn from the system by pipe 19. If desired, the solid may be withdrawn by a branched pipe 20 connecting with the withdrawal pipe 3 in which case the pipe 19 need not be employed.

At various points in the equipment fluidizing gas is added, for example, in the bottoms of the cyclones 14 and 15, in pipes 4 and 4a and line 3 as indicated by the short valved branch pipes shown on the drawing.

The piping shown in Fig. 1 is arranged to permit the withdrawal of a stream of fluidized catalyst from the lower part of the reactor 1 which is generally the most desirable operation, but it will be appreciated that other operations can be carried out. As an example of another piping hook-up, pipe 17 may be arranged to feed directly into pipe 3 which is then no longer directly connected with the interior of drum 1. The flow of fluidized catalyst is then directly upward through reactor 1 and it streams over into the separator 14 from which it is returned to the reactor by way of pipe 3, branch pipes 4 and 4a, exchangers 5 and 5a and finally pipes 6 and 6a. In this piping arrangement the undesirable circulation pointed out above can be and is encountered if precautions to avoid it are not taken.

In order to show the details of the present invention, reference is now made to Fig. 2, which shows on an enlarged scale one side of the lower end of the reactor 1, a part of the conical bottom 2 and the withdrawal pipe 3. Exchanger 5 is not shown but pipe 6 which conducts the fluidized solid stream from the exchanger and into the reactor is shown. The upper end of pipe 6 is brought close up to the grid 7, and preferably not more than two feet below such plate. The upper end of pipe 6 is capped or sealed off as indicated at 21. In the upper portion of this pipe, a large number of holes 22 are provided around the periphery of the pipe discharging laterally into the surrounding reactor space. It will be understood that the other pipe 6a, which is not shown on this drawing, is provided with similar arrangements. It will be understood that in vessels such as one containing fluidized solid there are present, what may be termed two different phases, that is to say, two layers of different density. As arranged and provided above, the pipe 6 is carried up sufficiently high so that the holes 22 discharge into the upper, less dense phase. When grid 7 is employed, it is to be understood that the pipes 6 and 6a will extend into the upper portion of the reactor space immediately below the grid, which portion will contain the less dense phase of the fluidized solid in the space below the grid.

In the operation of the reaction vessel, it will be understood that reactor 1 contains the fluidized solid and in starting up, a small portion of the catalyst or of the solid is passed in along with air, steam or inert gas as the case may be and the system is gradually raised to reaction temperature and the quantity of solid is gradually increased in the fluidized mixture until the operating ranges of temperature and density of the flowing streams is reached. Especially where the proportion of solid is small, it has been found that there is a tendency for an undesired circulation referred to above to be set up, for example, the flow may be upwardly through the exchanger 5 and into the reactor at pipe 6, then downwardly through the pipe 6a, exchanger 5a and around again to the exchanger 5 at pipes 4a and 4 or it may, of course, be in the reverse direction. In any case, it will be appreciated that such a circulation is not desirable and it is the purpose of the present arrangement of the discharge pipes to prevent such a cycle from being set up.

In designing the reactor it is important that the pipes 6 and 6a discharge at approximately the same level and that the pressure drop through the holes 22 be greater than the static head of pressure exerted by the solids in the reactor against the outlet side of the holes 22. If a distributor grid 7 is used, the static head of pressure exerted against the outlet of the holes 22 expressed in pounds per square inch will be substantially equal to the distance in inches between the holes 22 and the bottom of the grid 7 multiplied by the concentration of the solids in pounds per cubic inch in this section of the reactor.

If no grid 7 is employed, the static head of pressure expressed in pounds per square inch exerted against the outlet of the openings 22 will be substantially equal to the depth of the dense phase of fluidized solids in the reactor in inches multiplied by the concentration of solids in the fluidized bed in pounds per cubic inch. For example, in cases where the top level of the dense fluidized phase is at the top of the reactor 1 the total height of the reactor should be used in the calculations. On the other hand, where the upper level of the fluidized solids in the reactor extends to only one-third or one-half of the height of the reactor, the depth of the dense phase rather than the height of the reactor may be used in the calculations.

In operations employing fluidized solids, the solid should be reduced to a size finer than about 50 mesh and preferably less than 100 mesh and a minimal amount of vapor or gas necessary to permit flow must, of course, be provided. The flow through the system is induced by adding vapors or gases to the flowing streams in different amounts and causing a reduction of density in certain portions of the equipment which must be designed so that the opposing columns making up the flow lines and various pieces of equipment are of different densities. Thus the density in line 3 is greater than that in exchanger 5 and the difference in the product of the densities by the height of the opposing columns must be sufficient to overcome the loss in head due to friction in flowing through that portion of the equipment.

The reaction vessel shown herein may be only a small portion of the complete system comprising a reactor and regenerator and the exchangers may be employed to cool the regenerated catalyst, for example in normal operations where the reactor 1 is a catalyst regenerator. In the regenerator, carbon deposited on the catalyst is burned off by air which will be admitted along with the spent catalyst in line 8. The catalyst obtained from the pipes 19 or 20 is regenerated and may be fed to the reactor, which is not shown, for further use.

The present invention will be fully understood from the description given above. It is not to be limited to any particular use, for example for regeneration of catalysts, but only to the following claim in which it is desired to claim all novelty inherent in the invention.

We claim:

An apparatus adapted for contacting gases and finely divided solids comprising an outer vertically elongated shell forming an enclosed vessel, a conduit leading from the upper portion of said shell for removing gaseous materials therefrom, a horizontal perforated grid positioned in the lower portion of said shell, a conduit communicating with said shell below said grid for introducing a stream of gases and finely divided solids into said shell, a vertical conduit projecting through the bottom portion of said shell and extending upwardly in said shell above said grid for removing a stream of finely divided solids from said shell, a plurality of return conduits communicating with the bottom portion of said last-named vertical conduit projecting into the bottom portion of said shell below said grid, heat exchangers positioned in each of said last-named conduits whereby finely divided solids withdrawn from above said grid may be passed through said heat exchangers and returned to said shell below said grid, said return conduits being in open communication with each other, and said return conduits having a plurality of restricted orifices through which said solids discharge into said shell.

EDWIN J. GOHR.
CHARLES W. TYSON.

REFERENCES CITED

The following references are of record in the file of this patent:

UNITED STATES PATENTS

| Number    | Name      | Date           |
|-----------|-----------|----------------|
| 2,305,004 | Hemminger | Dec. 15, 1942  |
| 2,347,682 | Gunness   | May 2, 1944    |
| 2,358,888 | Thomas    | Sept. 26, 1944 |
| 2,373,008 | Becker    | Apr. 3, 1945   |
| 2,406,555 | Martin    | Aug. 27, 1946  |